(12) United States Patent
Liu et al.

(10) Patent No.: US 11,217,271 B1
(45) Date of Patent: Jan. 4, 2022

(54) CONTROL SYSTEM FOR FULLY AUTOMATIC TURNTABLE

(71) Applicant: HANPIN ELECTRON CO., LTD., Tainan (TW)

(72) Inventors: Shen-Keng Liu, Tainan (TW); Ying-Chao Tseng, Tainan (TW)

(73) Assignee: Hanpin Electron Co., Ltd., Tainan (TW)

(*) Notice: Subject to any disclaimer, the term of this patent is extended or adjusted under 35 U.S.C. 154(b) by 0 days.

(21) Appl. No.: 17/320,597

(22) Filed: May 14, 2021

(51) Int. Cl.
*G11B 3/085* (2006.01)
*G11B 19/20* (2006.01)
*G11B 3/60* (2006.01)

(52) U.S. Cl.
CPC ............ *G11B 3/085* (2013.01); *G11B 3/60* (2013.01); *G11B 19/20* (2013.01); *G11B 2220/20* (2013.01)

(58) Field of Classification Search
None
See application file for complete search history.

(56) References Cited

U.S. PATENT DOCUMENTS

| 4,734,902 | A  | * | 3/1988  | Dennis | G11B 3/085 369/176 |
| 9,454,977 | B1 | * | 9/2016  | Huang  | G11B 3/34          |
| 10,141,012 | B1 | * | 11/2018 | Lavoie | G11B 3/08512       |
| 11,031,030 | B1 | * | 6/2021  | Huang  | G11B 3/38          |

* cited by examiner

*Primary Examiner* — William J Klimowicz
(74) *Attorney, Agent, or Firm* — Rosenberg, Klein & Lee

(57) ABSTRACT

A control system for fully automatic turntables is revealed. The control system includes a receiver module therein for receiving signals from application programs to activate a drive source and a control assembly which control a platter and a tonearm respectively. The control assembly includes a first rod provided with an upper rack and a second rod provided with a lower rack. The first and second rods are inserted and installed on a base. A power source disposed on the base is for driving a first gear set correspondingly and a connecting rod is also moved to drive a second gear set. Thus partial gears of the first and second gear sets are engaged with the upper and lower racks alternately. The first and second rods are further driven to move or stop the tonearm respectively. Therefore, automatic movement of the tonearm is achieved.

4 Claims, 9 Drawing Sheets

CONTROL SYSTEM FOR FULLY AUTOMATIC TURNTABLE

BACKGROUND OF THE INVENTION

Field of the Invention

The present invention relates to a control system for fully automatic turntables, especially to a control system for fully automatic turntables with fully automatic operation by which a tonearm of a turntable is rotated automatically to play records or retuned after finishing the playing under control of application programs (APP).

Description of Related Art

Generally, users need to move a tonearm onto/over a vinyl record by manual operation for retrieving music information within the rotating vinyl record while using a turntable. When the music played is finished or the user presses a stop button on the turntable, the tonearm is automatically driven to go back to the original position. That means the turntable is only having "Auto Return" function of the tonearm, without providing the "Auto Play" function so that the tonearm is moved onto the vinyl record by manual operation and such design is not convenient to use.

Thus there is room for improvement and there is a need to provide a novel fully automatic turntable which overcomes the shortcomings mentioned above. The tonearm of the fully automatic turntable is automatically moved onto the vinyl record for reading and play music. After finishing playing, the tonearm is automatically turned back to the resting position. The activation and return of the tonearm are both automatic.

SUMMARY OF THE INVENTION

Therefore. it is a primary object of the present invention of the present invention to provide a control system for fully automatic turntables with fully automatic operation by which a tonearm of a turntable is rotated automatically to play records or retuned after finishing the playing under control of application programs (APP).

In order to achieve the above object, a control system for fully automatic turntables according to the present invention is mainly provided with a receiver module disposed therein for receiving signals from application programs. A drive source for control of a platter and a control assembly for control of a tonearm are activated by the signals transmitted from the receiver module. The control assembly includes a first rod provided with an upper rack and a second rod provided with a lower rack. Both the first rod and the second rod are inserted and installed on a base while a power source is disposed on the base for driving a first gear set correspondingly and a connecting rod is also moved to drive a second gear set. Thus a partial gear of the first gear set and a partial gear of the second gear set are engaged with the upper rack and the lower rack respectively and alternately. Then the first rod and the second rod are further driven to move and stop the tonearm respectively and indirectly. Therefore, either the automatic rotation of the tonearm to play music or return of the tonearm after finishing playing the music under control of the control assembly of the fully automatic turntable is achieved.

Preferably, the first gear set is formed by a plurality first gears connected, a link gear, and a first partial gear with a part of teeth. The first gear set is installed on the base and one of the first gears is correspondingly meshing with a driving gear of the power source for power transmission. The second gear set composed of a plurality second gears connected and a second partial gear with a part of teeth is installed on the base. One of the second gears is connected to the connecting rod correspondingly for transmitting power from the first gear set to the second gear set.

Preferably, a control member is disposed on the base and a tactile switch is arranged at each of two sides of the control member. One end of the first rod and one end of the second rod are both provided with a stopping piece which is able to be contacted with or separated from the tactile switch.

Preferably, a slot is formed on one side of the power source for allowing the connecting rod to insert through.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, features and functions of the present invention more completely and clearly, please refer to the following detailed description with reference to the accompanying figures and reference signs.

Figure 1:
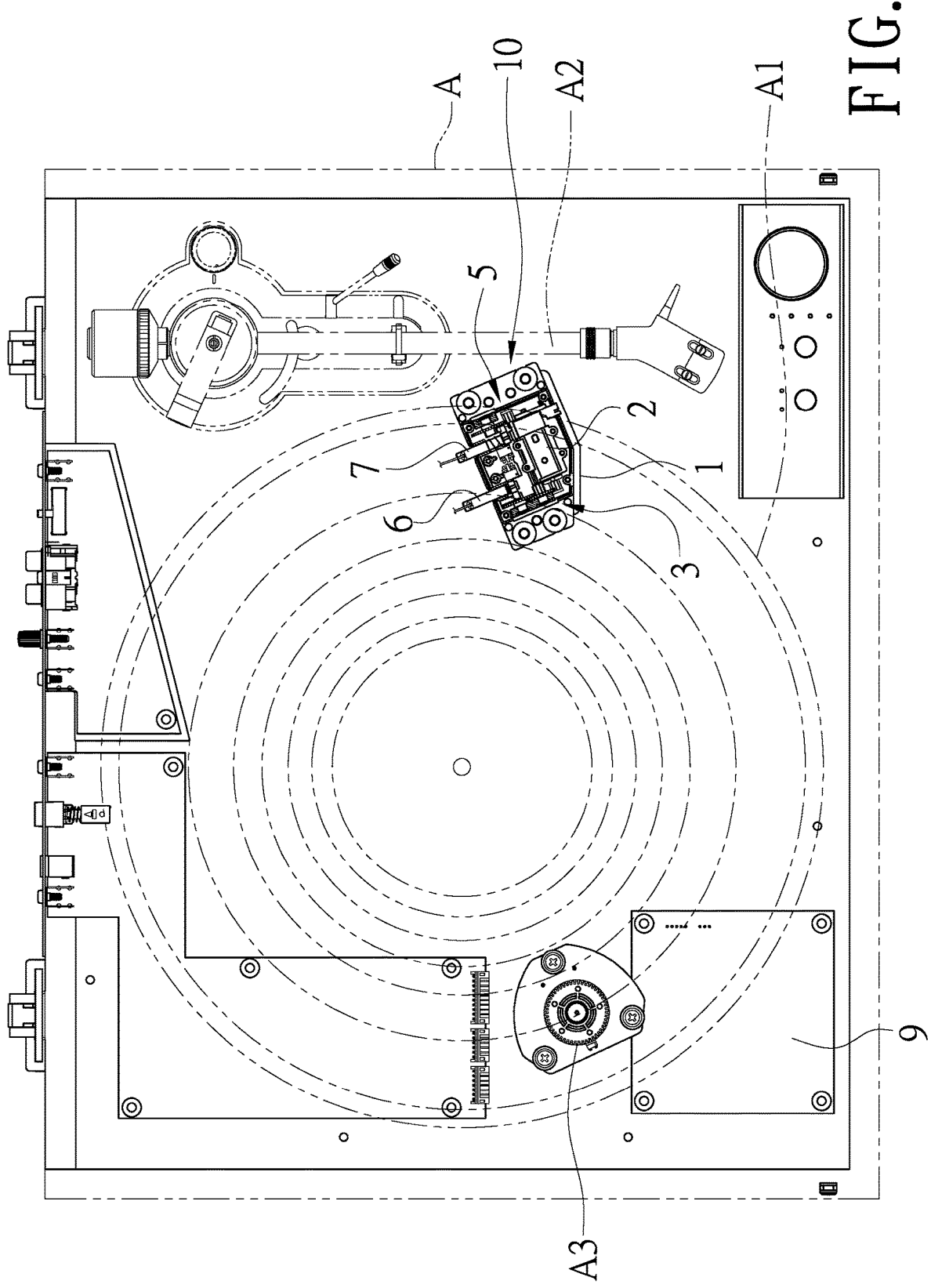
FIG. 1 is a schematic drawing showing a top view of an embodiment according to the present invention.
Figure 2:
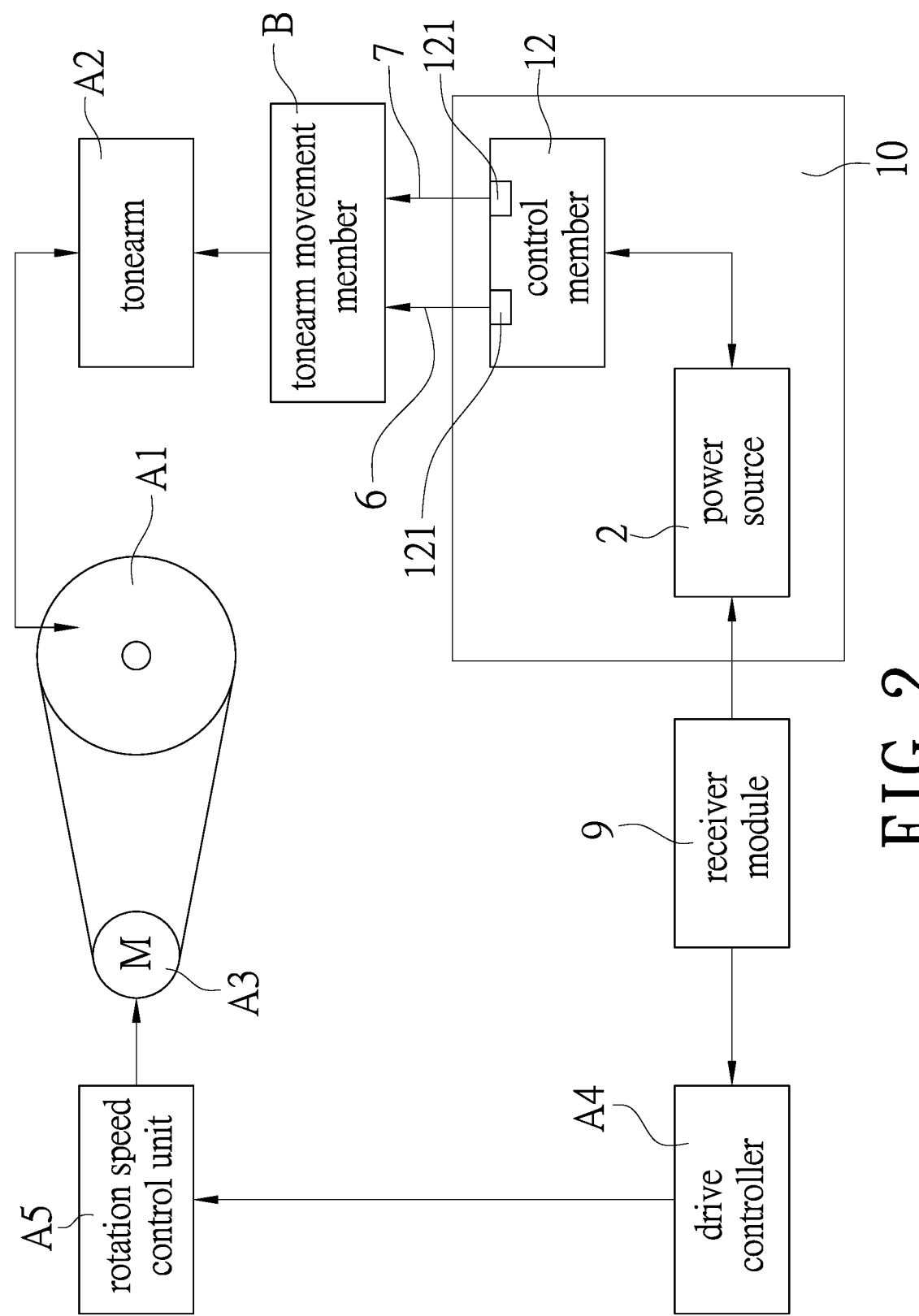
FIG. 2 is a schematic drawing showing structure of an embodiment according to the present invention.
Figure 3:
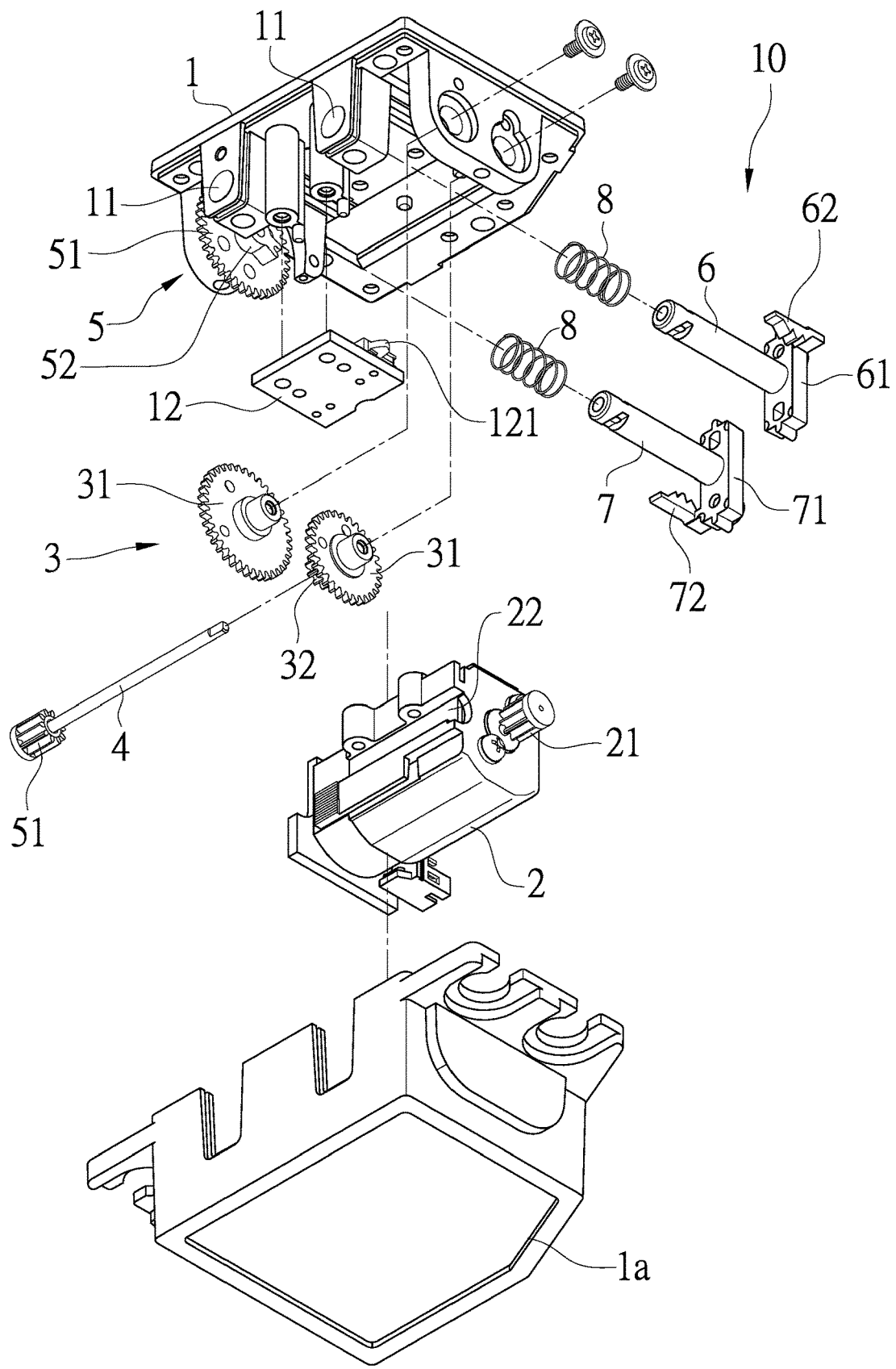
FIG. 3 is an exploded view of a control assembly of an embodiment according to the present invention.

Refer to FIG. 1, FIG. 2, and FIG. 3, schematic drawings showing a top view, structure, and exploded view of a control system for fully automatic turntables according to the present invention are disclosed. A turntable A includes a receiver module 9 which is mounted in the turntable A and used for receiving wireless signals, a drive source A3 for control of rotation of a platter A1, and a control assembly 10 for control of movement of a tonearm A2. The receiver module 9 sends the signals received to activate the drive source A3 and the control assembly 10. The control assembly 10 consists of a base 1, a power source 2, a first gear set 3, a connecting rod 4, a second gear set 5, a first rod 6, and a second rod 7.

The power source 2 is installed on the base 1 and provided with a driving gear 21 arranged at an output shaft of the power source 2. Two axial holes 11 are mounted to the base 1 and a control member 12 is located between the two axial holes 11. A tactile switch 121 is arranged at each of two sides of the control member 12.

The first gear set 3 is formed by a plurality first gears 31 connected, a link gear 32, and a first partial gear 33 with a part of teeth. The first gear set 3 is installed on the base 1 and one of the first gears 31 is correspondingly meshing with the driving gear 21 for power transmission.

One end of the connecting rod 4 is connected to the link gear 32.

The second gear set 5 composed of a plurality second gears 51 connected and a second partial gear 52 with a part of teeth is installed on the base 1. One of the second gears 51 is connected to the connecting rod 4 correspondingly for transmitting power from the first gear set 3 to the second gear set 5.

The first rod 6 includes a first stopping piece 61 which is arranged at one end of the first rod 6 and able to be contacted with or separated from the tactile switch 121, and an upper rack 62 which is disposed on an upper end of the first stopping piece 61 and able to be engaged with or released from the first partial gear 33 correspondingly. An elastic member 8 is fit around the other end of the first rod 6 and then the first rod 6 with the elastic member 8 is inserted through one of the axial holes 11 of the base 1.

The second rod 7 consists of a second stopping piece 71 which is disposed on one end of the second rod 7 and able to be contacted with or separated from the tactile switch 121, and a lower rack 72 which is disposed on a lower end of the second stopping piece 71 and able to be engaged with or released from the second partial gear 52 correspondingly. An elastic member 8 is fit around the other end of the second rod 7 and then the second rod 7 with the elastic member 8 is inserted through the other axial hole 11 of the base 1.

Refer to FIG. 1-4, a turntable A of the present invention is mainly composed of a platter A1, a drive source A3 which drives the platter A1 to rotate, a tonearm A2, and a tonearm movement member B which pushes the tonearm A2. The first and the second rods 6, 7 and the tonearm movement member B are connected by respective elastic tie rods C. An outer cap 1a is used to cover the base 1. The way to activate the present device by wireless signals can be performed via remote control, an application program (APP), etc.

While in use, the turntable A receives wireless signals by the receiver module 9. In other words, it is activated by remote control or the APP. For example, signals are transmitted from the APP to the receiver module 9. After the receiver module 9 receiving the signals, both the control assembly 10 and the drive source A3 are simultaneously driven to work by the receiver module 9. The drive source A3 of the platter A1 is connected to a drive controller A4 which drives the drive source A3 to work. For selecting rotation speed (33, 45, or 78 rpm) according to requirements for different records, the turntable A is further provided with a rotation speed control unit A5 connected to the drive controller A4 and the drive source A3 for effective control of the rotation speed of the drive source A3. At the same time, the power source 2 of the control assembly 10 is also driven to move.

When the power source 2 rotates to drive the driving gear 21 to rotate, the first gear set 3 is further driven by the driving gear 21 to rotate. Then the connecting rod 4 is driven by the link gear 32 of the first gear set 3 to rotate and the power is transmitted through the connecting rod 4 to make the second gear set 5 also rotate. The first partial gear 33 of the first gear set 3 and the second partial gear 52 of the second gear set 5 are designed to make the first rod 6 and the second rod 7 move in the manner that one is extended while the other is retracted. The details are described in the following paragraphs.

Figure 4:
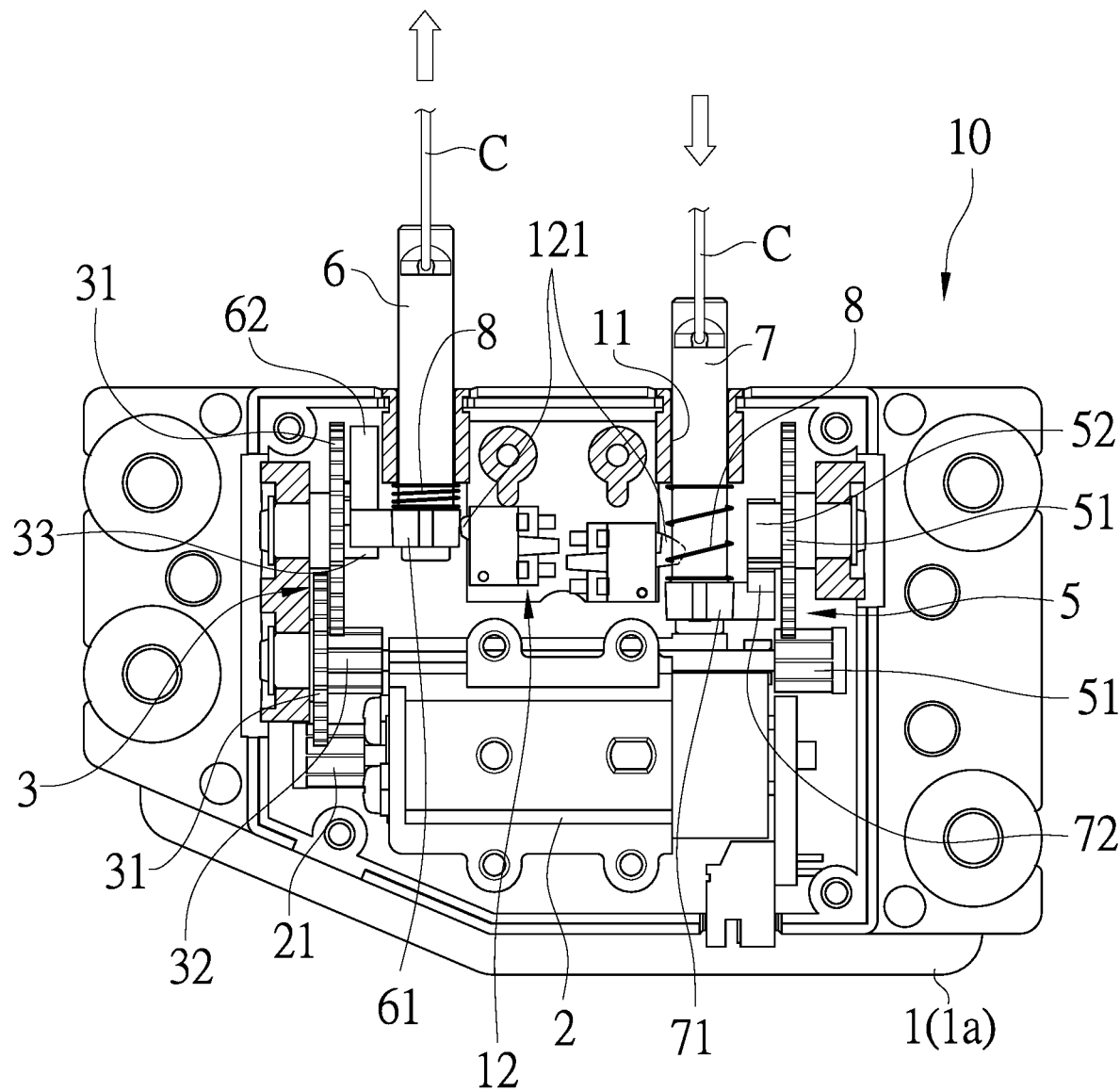
FIG. 4 is a planar schematic drawing showing action of a control assembly of an embodiment according to the present invention.
Figure 5:
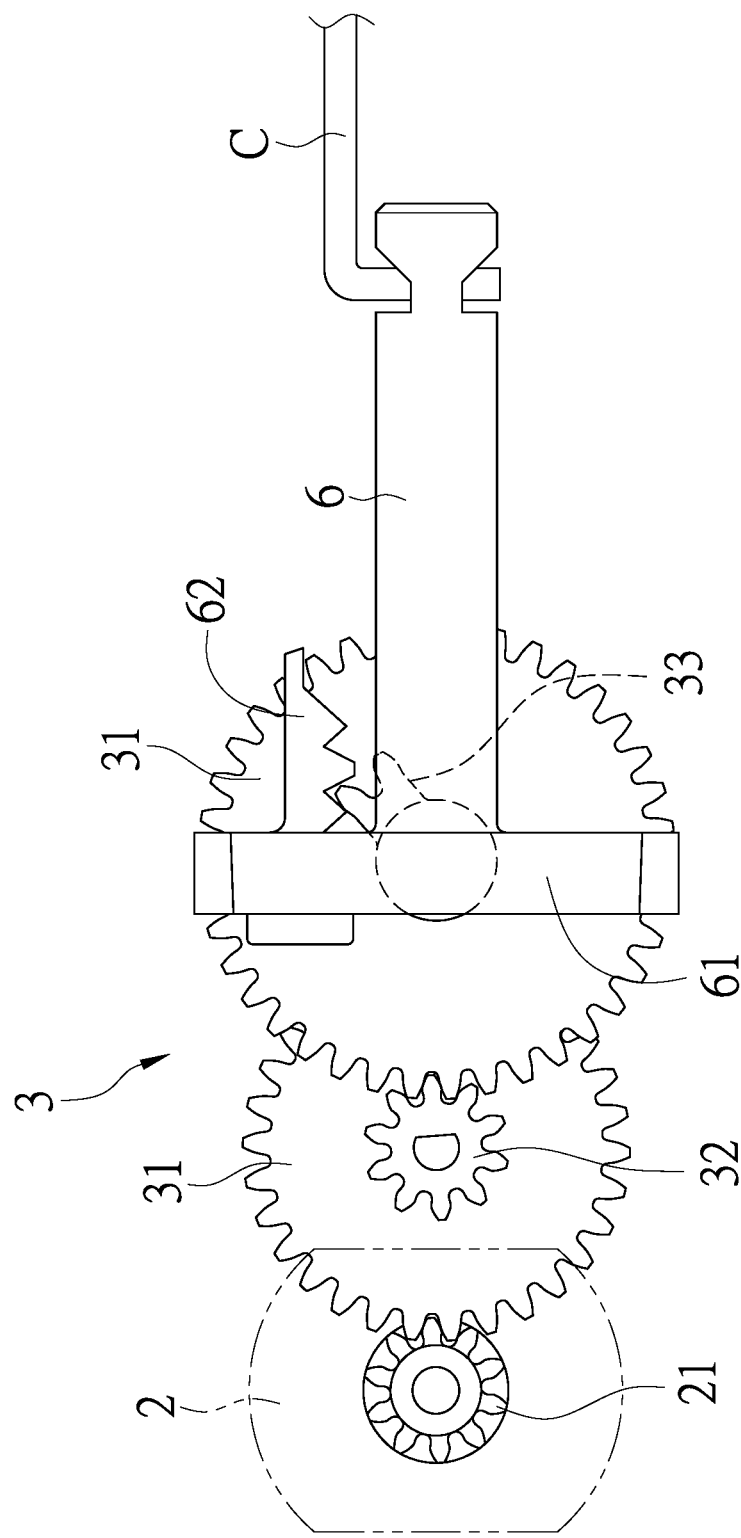
FIG. 5 is a schematic drawing showing action of a first rod of an embodiment according to the present invention.
Figure 6:
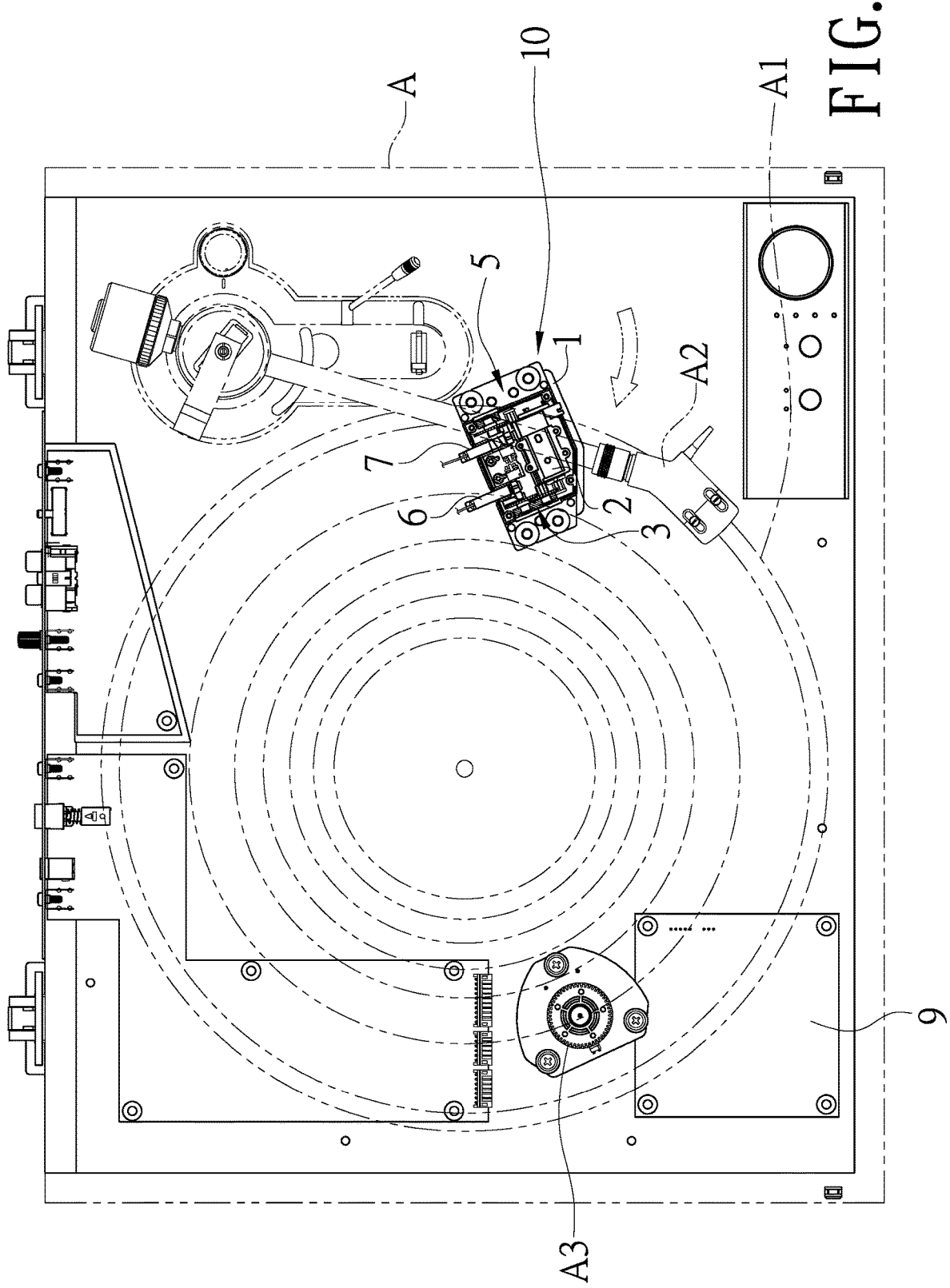
FIG. 6 is a schematic drawing showing movement of a tonearm of an embodiment according to the present invention.

Refer to FIG. 4-6, when the first gear set 3 is rotated, the power is transmitted to the first partial gear 33 which is engaged with the upper rack 62 of the first rod 6 through the plurality first gears 31 and further driving the first rod 6 to move forward in the axial hole 11. During the movement, the elastic member 8 on the first rod 6 is compressed and the first rod 6 keeps moving to make the first stopping piece 61 contact with the tactile switch 121 on one side of the control member 12. Thereby the tonearm movement member B is driven to push the tonearm A2. The tonearm movement member B has a plurality of forms. One end of the elastic tie rod C is arranged at the first rod 6 while the other end thereof is connected to the tonearm movement member B. Thereby the movement of the first rod 6 actuates the tonearm movement member B to drive the tonearm A2 to move and push the tonearm A2 onto the platter A1, as shown in FIG. 5 and FIG. 6. When the first rod 6 is acted, the second gear set 5 is also rotated. Yet the second gear set 5 is idling because that the second partial gear 52 is not engaged with the lower rack 72 of the second rod 7.

Figure 7:
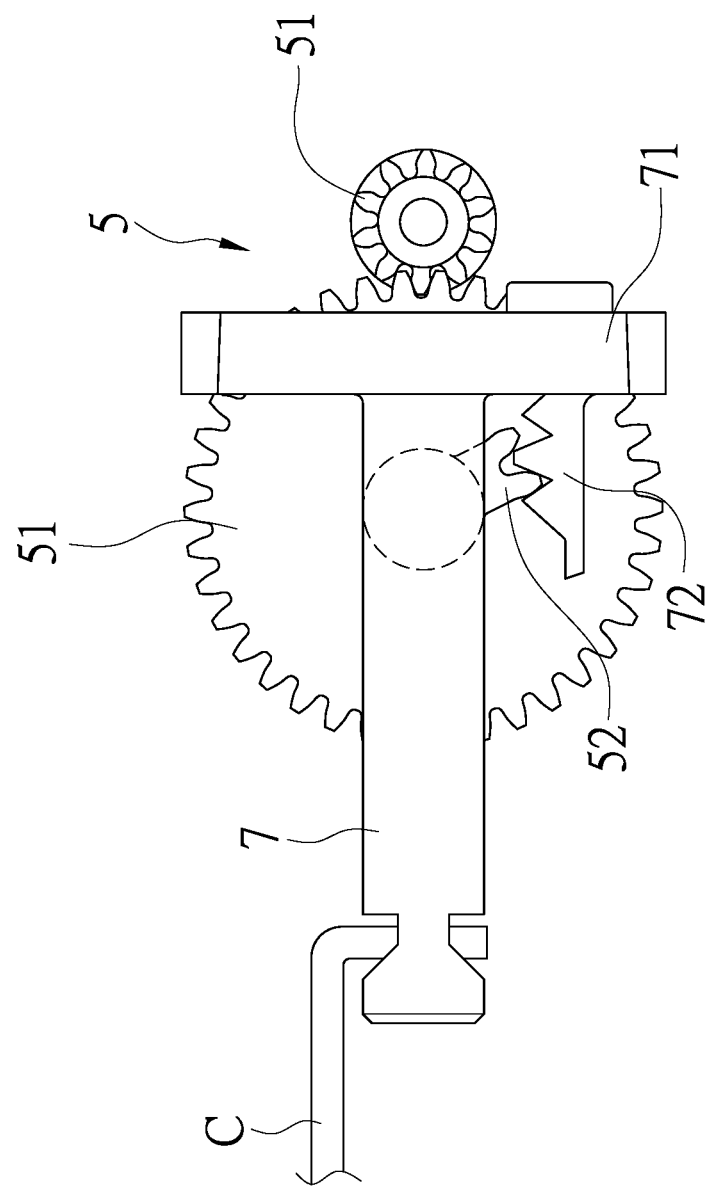
FIG. 7 is a schematic drawing showing action of a second rod of an embodiment according to the present invention.
Figure 8:
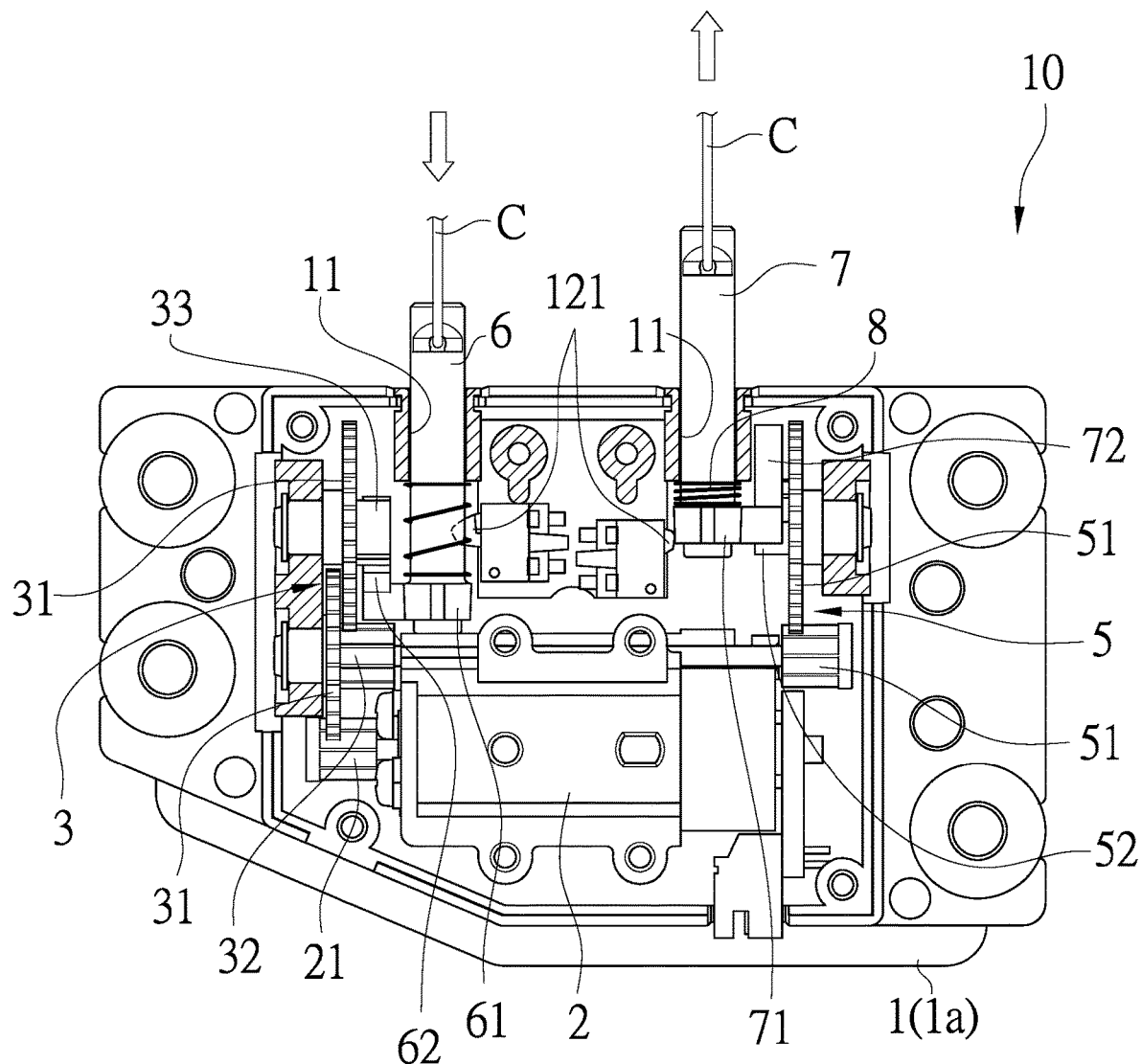
FIG. 8 is another planar schematic drawing showing action of a control assembly of an embodiment according to the present invention.
Figure 9:
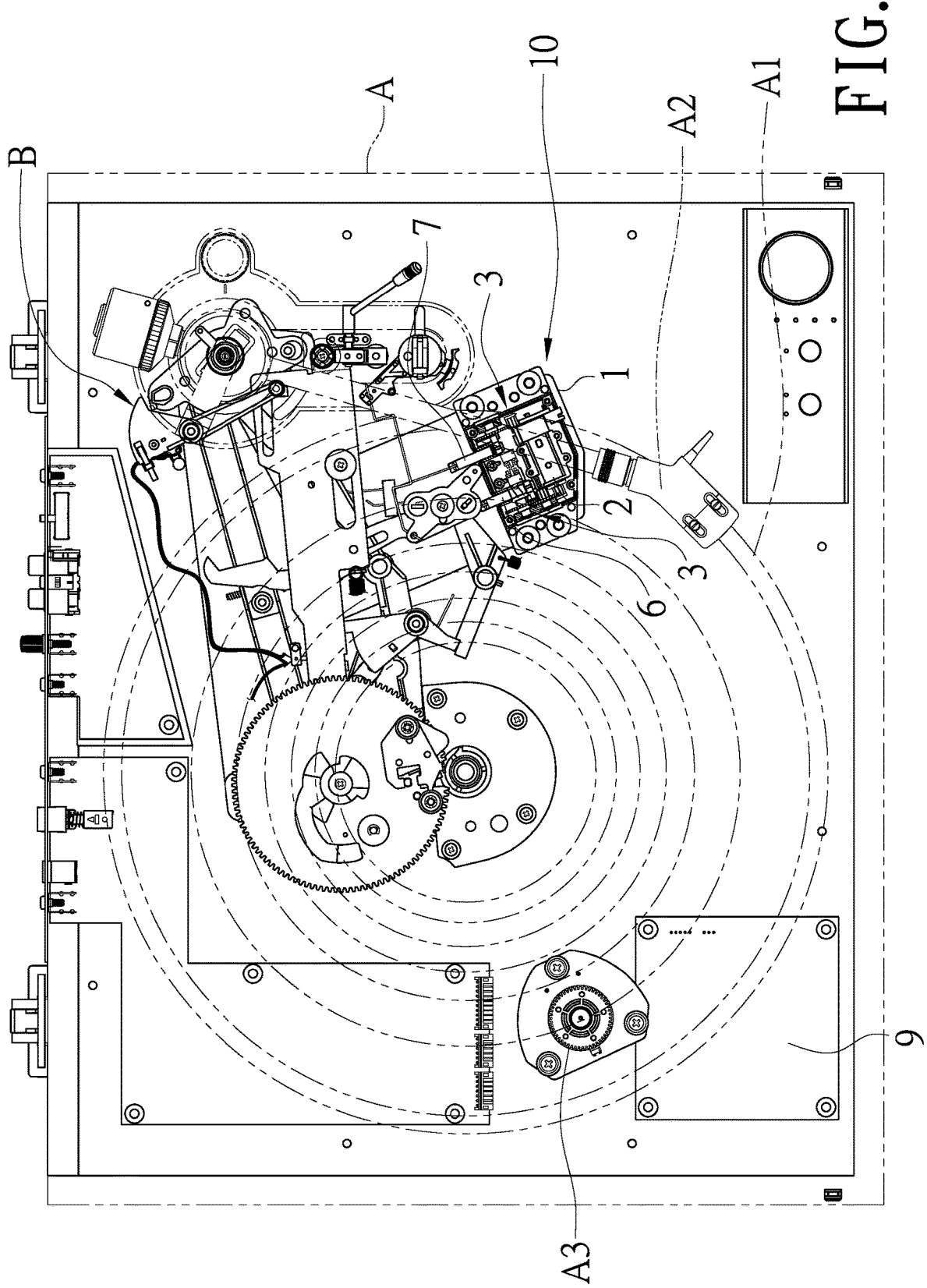
FIG. 9 is another schematic drawing showing a top view of an embodiment in action according to the present invention.

Refer to FIG. 7-9, when the second gear set 5 is rotated and the second partial gear 52 is engaged with the lower rack 72 of the second rod 7, the first partial gear 33 of the first gear set 3 is not engaged with the upper rack 62 of the first rod 6 at the moment. Without being limited by the engagement between the first partial gear 33 and the upper rack 62, the first rod 6 is returned by an elastic force released from the elastic member 8. When the second rod 7 is driven, the second rod 7 is moved forward in the axial hole 11. During the movement, the elastic member 8 on the second rod 7 is compressed and the second rod 7 keeps moving to make the second stopping piece 71 contact with the tactile switch 121 on the other side of the control member 12. Thereby the tonearm movement member B is controlled to stop moving the tonearm A2 which has already been moved to the platter A1 and ready to be played.

It should be noted that the upper rack 62 and the lower rack 72 are not limited to be disposed on the first rod 6 and the second rod 7 respectively. In other embodiments, the upper and lower racks 62, 72 can be arranged at different rods 6, 7 as long as the upper and lower racks 62, 72 are disposed on opposite ends of the first and second rods 6, 7.

In addition, a slot 22 is formed on one side of the power source 2 for allowing the connecting rod 4 to insert through and mounted therein.

In summary, the present invention has the following advantages. The present system is activated by signals transmitted wirelessly. Then the drive source of the platter and the two rods of the control member are driven to work at the same time and the two rods are moved alternately. The first rod is used to actuate the tonearm to move and the second rod is for stopping the tonearm at certain positions. Thereby the tonearm is rotated automatically to play records and retuned after finishing the playing under control of the control assembly of the fully automatic turntable.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A control system for fully automatic turntables comprising: a receiver module disposed in the control system for receiving signals from application programs, a drive source which is used for control of a platter and activated by the signals from the receiver module, and a control assembly which is used for control of a tonearm and activated by the signals from the receiver module; wherein the control assembly includes:

a base having two axial holes and a control member which is located between the two axial holes and provided with a tactile switch arranged at each of two sides of the control member;

a power source installed on the base and provided with a driving gear arranged at an output shaft of the power source;

a first gear set disposed on the base and composed of a plurality of connected first gears, a link gear, and a first partial gear with a part of teeth; one of the first gears is correspondingly meshing with the driving gear for power transmission;

a connecting rod having one end thereof connected to the link gear;

a second gear set arranged at the base and composed of a plurality of connected second gears and a second partial gear with a part of teeth; one of the second gears is connected to the connecting rod correspondingly for transmitting power from the first gear set to the second gear set;

a first rod having a first stopping piece which is disposed on one end and able to be contacted with or separated from the tactile switch, and an upper rack which is arranged at an upper end of the first stopping piece and able to be engaged with or released from the first partial gear correspondingly; an elastic member is arranged around the first rod and the first rod with the elastic member is inserted through one of the axial holes of the base; and a second rod having a second stopping piece which is disposed on one end and able to be contacted with or separated from the tactile switch, and a lower rack which is disposed on a lower end of the second stopping piece and able to be engaged with or released from the second partial gear correspondingly; a second elastic member is arranged around the second rod and the second rod with the second elastic member is inserted through the other axial hole of the base.

2. The control system for fully automatic turntables as claimed in claim 1, wherein the control system further includes a drive controller and a rotation speed control unit; wherein the drive controller is connected to the receiver module for receiving the signals from the receiver module while the rotation speed control unit is connected to both the drive controller and the drive source and used for control of rotation speed of the drive source.

3. The control system for fully automatic turntables as claimed in claim 2, wherein a slot is mounted on one side of the power source for allowing the connecting rod to insert through.

4. The control system for fully automatic turntables as claimed in claim 1, wherein a slot is mounted on one side of the power source for allowing the connecting rod to insert through.

* * * * *